United States Patent
Lipka et al.

(10) Patent No.: US 8,931,105 B2
(45) Date of Patent: Jan. 6, 2015

(54) METHOD, SYSTEM AND SOFTWARE PRODUCT FOR TRANSFERRING CONTENT TO A REMOTE DEVICE

(75) Inventors: Martin Lipka, Prahran (AU); Alexander Dubov, Prahran (AU)

(73) Assignee: Vividas Technologies Pty. Ltd., Prahran, Victoria (AU)

( * ) Notice: Subject to any disclaimer, the term of this patent is extended or adjusted under 35 U.S.C. 154(b) by 1110 days.

(21) Appl. No.: 12/528,916

(22) PCT Filed: Mar. 3, 2008

(86) PCT No.: PCT/AU2008/000361
§ 371 (c)(1),
(2), (4) Date: May 18, 2010

(87) PCT Pub. No.: WO2008/106749
PCT Pub. Date: Sep. 12, 2008

(65) Prior Publication Data
US 2010/0228975 A1 Sep. 9, 2010

(30) Foreign Application Priority Data
Mar. 2, 2007 (AU) .............................. 2007901104

(51) Int. Cl.
*H04L 29/06* (2006.01)
*G06F 21/12* (2013.01)
(Continued)

(52) U.S. Cl.
CPC .............. *H04L 63/061* (2013.01); *H04L 63/04* (2013.01); *G06F 2211/007* (2013.01); *H04L 63/10* (2013.01); *G06F 21/12* (2013.01);
(Continued)

(58) Field of Classification Search
CPC ......... G06F 21/10; G06F 21/12; G06F 21/14; G06F 21/44; G06F 21/05; G06F 21/06; G06F 2221/2141; G06F 2221/2107; G06F 2221/2137; G06F 2211/007; H04L 63/04; H04L 63/06; H04L 63/10; H04L 63/12; H04L 2209/04; H04L 63/16; H04L 63/60; H04L 2463/041; H04L 2463/101; H04L 9/08; H04L 9/28
USPC .............. 726/26–33; 713/150–152, 164–167, 713/189; 380/200–203, 259–263, 268–269, 380/36–37, 28–30; 717/162–178
See application file for complete search history.

(56) References Cited

U.S. PATENT DOCUMENTS 5,629,980 A     5/1997   Stefik et al.
(Continued)

FOREIGN PATENT DOCUMENTS

| WO | WO 03/005190 | 1/2003 |
|----|--------------|--------|
| WO | 2006000029 A1 | 1/2006 |

OTHER PUBLICATIONS

Handbook of Applied Cryptography by Menezes et al; Publisher: CRC Press; Year: 1996.*

*Primary Examiner* — Madhuri Herzog
(74) *Attorney, Agent, or Firm* — Greer, Burns & Crain, Ltd.

(57) ABSTRACT

The present invention relates to a method for transferring content to a device, the method including the steps of: receiving a request for content from the device; delivering a uniquely identifiable, ephemeral player to the device; and transferring content to the device, for presentation on the device by the player. The invention has particular application to digital rights management in respect of the distribution of audiovisual content such as film and television programs, advertisements and live event broadcasts over communication networks such as the Internet.

16 Claims, 5 Drawing Sheets

(51) Int. Cl.
*G06F 21/44* (2013.01)
*G06F 21/10* (2013.01)

(52) U.S. Cl.
CPC .............. *G06F 21/44* (2013.01); *G06F 21/121* (2013.01); *H04L 63/102* (2013.01); *H04L 2463/101* (2013.01); *G06F 21/10* (2013.01); *G06F 2221/0748* (2013.01); *G06F 2221/0753* (2013.01); *H04L 65/4084* (2013.01)
USPC .................. 726/26; 726/27; 726/28; 726/30; 726/31; 713/150; 713/151; 713/165; 713/167; 713/189; 380/200; 380/201; 380/259; 380/28; 717/162; 717/163; 717/166; 717/174; 717/178

(56) References Cited

U.S. PATENT DOCUMENTS

| | | | |
|---|---|---|---|
| 7,058,606 | B2 | 6/2006 | Stefik et al. |
| 7,069,293 | B2* | 6/2006 | Cox et al. ....................... 709/203 |
| 2002/0146122 | A1* | 10/2002 | Vestergaard et al. ......... 380/231 |
| 2003/0158816 | A1 | 8/2003 | Rouse |
| 2004/0088576 | A1* | 5/2004 | Foster et al. ................... 713/201 |
| 2004/0133908 | A1* | 7/2004 | Smith et al. ..................... 725/31 |
| 2004/0156613 | A1* | 8/2004 | Hempel et al. .................. 386/46 |
| 2004/0162910 | A1* | 8/2004 | Kryeziu ......................... 709/231 |
| 2005/0005146 | A1* | 1/2005 | Kryeziu ......................... 713/193 |
| 2005/0138400 | A1 | 6/2005 | Wu et al. |
| 2007/0014412 | A1* | 1/2007 | Rollins ......................... 380/277 |

* cited by examiner

METHOD, SYSTEM AND SOFTWARE PRODUCT FOR TRANSFERRING CONTENT TO A REMOTE DEVICE

FIELD OF THE INVENTION

The present invention relates to a method, system and software product for transferring content to a remote device. In particular, the invention is for use with respect to content that is to be protected from use other than in accordance with the authority of the holder of rights in the content. The invention has particular application to the distribution of audiovisual content such as film and television programs, advertisements and live event broadcasts over communication networks such as the Internet.

BACKGROUND OF THE INVENTION

In this specification, where a document, act or item of knowledge is referred to or discussed, this reference or discussion is not an admission that the document, act or item of knowledge or any combination thereof was at the priority date part of common general knowledge, or known to be relevant to an attempt to solve any problem with which this specification is concerned.

The creative industries, such as those involved in film, television program and advertisement production, and in the broadcast of live events, operate on a basic proposition that holders of rights in the relevant content are remunerated for the use of that content. This promise of (sometimes very lucrative) remuneration provides an incentive to producers to undertake substantial financial risks involved in the creation of such content. In the traditional distribution chain, rights holders receive remuneration through means such as ticket sales, physical media sales and rentals, advertising revenue and subscription fees.

Internet connection speeds are continually improving as broadband networks are deployed, and it is now becoming feasible to use the Internet as a content distribution medium. However, whilst it may be technically feasible to distribute content such as film and television programs and live event broadcasts over the Internet, commercial considerations associated with protecting rights holders against unauthorised use of their content and thereby providing proper remuneration, are yet to be adequately resolved.

Content may be transferred over the Internet either by downloading or streaming. Downloading involves the transfer of an entire file to a device for subsequent viewing by means of pre-installed playing software, such as the Windows Media Player or Apple's Quicktime, whereas streaming involves the simultaneous downloading and playing of a file, with the playing software commencing play as soon as it has downloaded sufficient data to do so.

The key advantage of streaming over downloading is that a user need not wait for the complete download of a large file (a process which may take some time) before commencing a playback session. Downloading is thus generally unsuitable to Internet broadcasts of live events in real time or close to real time, which can only be implemented by way of content streaming.

Applicant's previous International Patent Application WO-03/005190, the contents of which are hereby incorporated by reference, describes a system and method for content playback using a player which is not saved to the user's machine and which can be effected without reference to the operating system registry. The invention can be applied to both streamed content and saved content (eg. content on a physical medium).

Generally, when streaming is adopted, eg. to broadcast a live event on a pay-per-view basis, vulnerabilities in current streaming software packages can leave open the possibility of unauthorised use of the streamed content. One such vulnerability, known as playback control circumvention, involves an attacker stripping or modifying content entitlements to gain unauthorised access to the content. This enables an unauthorised user to access content and to possibly redistribute the illegally accessed content, thereby denying the rights holder of due compensation.

Another mode of attack involves a user making an exact copy of a specific instance of a media player, enabling the user to violate replay limitations.

A further weakness in current web streaming system enables users to steal or reuse a specific session ID allowing them to view the content more often than intended by the rights holder.

It would be advantageous to provide a web streaming system which is less vulnerable to attack through one or more of these modes than the systems which are currently available.

SUMMARY OF THE INVENTION

According to a first aspect of the present invention, there is provided a method for transferring content to a device, the method including the steps of:

receiving a request for content from the device;

delivering a uniquely identifiable, ephemeral player to the device; and transferring content to the device, for presentation on the device by the player.

In this specification, including the claims, the term 'ephemeral' refers to a software program which is not installed on the operating system, nor saved to non-volatile storage of the device on which it runs.

The present invention imposes a requirement for a user to download a new player (which is itself uniquely identifiable and ephemeral) for each and every playback session, and in doing so, ameliorates the disadvantages of present content delivery systems noted above. In particular, pre-recorded or live content may be uniquely identified, validated and tracked.

One or more separate media files, may be delivered as part of a single playback session, to be presented on the player for that particular session.

Moreover, the requirement for a user to download a new player for each and every playback session also frustrates the attempts of those seeking unauthorised access or replaying of content.

The present invention is particularly suitable, for the transfer of content to a device by way of streaming. However, it can also be used to protect content that is delivered through downloading.

Preferably, the step of delivering a uniquely identifiable ephemeral player comprises:

including a unique identifier in player code that is executable on the device to produce the player; and delivering the player code to the device.

Typically, the unique identifier comprises a session key. According to this embodiment, the method may includes the steps of:

storing the session key; and validating content requests from the device against the stored key.

It will be realised that the session key is used to uniquely identify the player, as well as for validation of content requests. Using a session key for both of these purposes of a dual role session key ensures that content is only delivered to devices with a valid session key (or session ID), linked to that particular unique player.

This embodiment of the invention alleviates the problem of session cloning, where session IDs are obtained and used to view content more often than intended by the rights holder. The problem is particularly apparent in video-on-demand applications where illegally obtained session IDs deny rights holders due remuneration for repeated viewing of their content, and can also result in legitimate users being charged for these unauthorised viewings.

In preferred embodiments, the step of validating content requests against the stored key comprises attempting to decrypt the content request using the stored key.

In preferred embodiments, the player code comprises one or more libraries that are delivered to the device for operable interaction with one or more graphics systems associated with the device's operating system, the libraries being generated by linking one or more object code files that are adapted to execute in the device's native operating system, and wherein the unique identifier is included in the player code by incorporation into the object code files, whilst or before those files are linked into the libraries.

Preferably, the method includes the step of delivering a loader to the device prior to the step of delivering the player, the loader being configured to:
  request permission for execution of code in the device's native operating system environment;
  request delivery of the player in the event that permission is granted; and
  directly load the player into memory of the device for execution.

Optionally the loader has a predetermined expiry time, wherein playback session requests made outside of the expiry time need not be fulfilled.

The loader may be, for example, a byte code compiled program, such as a Java applet.

Optimally, the session key is incorporated into a location within the library, that is known to the loader.

The method may include the step of delivering and decrypting the content to enable it to be played on the player.

Optionally, the step of transferring content to the device comprises:
  dividing the content into segments; and
  continually delivering segments of content in response to individual requests for content from the device.

In preferred embodiments, the method includes the step of encrypting each content segment with an encryption key specified in the request for content.

Optimally, each said encryption key is unique. The use of a unique encryption key in each and every request for content ensures that unauthorised users who may obtain a key will only be able to encrypt the current content segment. Obtaining unauthorised access to the entire content file—such as a film—would require every authentication key to be obtained, which is a far more difficult proposition for an attacker.

The present invention may be used to provide digital rights management to any content including material such as film and television programs, live action such as sporting events, as well as musical and other works.

The method may also be implemented in any device which may be communicatively coupled to a content server via a suitable network protocol, including PCs, PDA, laptop, computers and mobile phone handsets.

The method may also be easily incorporated into pay per view, or other selective access systems.

According to a second aspect of the present invention, there is provided a secure content delivery system comprising:
  a content server; and
  one or more devices communicatively coupled to the content server via a communications network,
wherein the content server is configured to deliver a uniquely identifiable and ephemeral player to a device in response to each individual playback session request from the device.

Preferably, the content server includes means for generating unique player code that is executable on the or each device to produce the uniquely identifiable and ephemeral player.

Optionally, the means for generating the unique player code comprises means for including a unique identifier in player code.

In preferred embodiments, the player code comprises one or more libraries that operatively interact with one or more graphics systems associated with the device's operating system, the libraries being generated by linking one or more object code files that are adapted to execute in the device's native operating system, and wherein the unique identifier is included in the player code by incorporation into the object code files, whilst or before those files are linked into the libraries.

Preferably, the content server includes means for delivering a loader to the device prior to delivering the player, the loader being configured to:
  request permission for execution of code in the devices native operating system;
  request delivery of the player in the event that permission is granted; and
  directly load the player into main memory of the device for execution.

According to a third aspect of the present invention there is provided a software product executable on a content server and adapted to deliver a uniquely identifiable and ephemeral player to a device in response to each individual playback session requested from the device.

Ideally, for streaming video, content protection systems should be able to control access to content, enforce business rules (such as number of plays, media expiration, sharing rights and publisher rights), support hardware encryption (where possible), ensure confidentiality of communication between user and provider, detect or prevent attempts to replay sessions, and flexibly and dynamically update client-side protection systems.

Use of the present invention enables meeting wholly or at least partially each of the above objectives. A key feature of the architecture of the system of the invention is the enforced separation of the public portion of the player (ie. the Java applet loader) from the private portion of the player (the dynamically-generated DLLs and session key). Because the private portion of the player is uniquely generated and validated for each playback session, the distributor achieves a high level of assurance that playback sessions are unique and have not been replayed.

The approach of the invention largely eliminates the risks associated with the most common attack vectors, particularly player cloning and key extraction. Although complete security against the most determined attackers is seldom, if ever, guaranteed, the invention makes attack in almost all modes sufficiently difficult (and thus expensive) to reduce the likelihood of such attack significantly. Notably:
  playback sessions are unique and cannot be replayed;
  keys are stored in memory, not saved to disk;

successful reverse engineering of a player's session key will not compromise a subsequent playback session; and use of renewable library generation and key recovery algorithms mean that countermeasures can be adjusted quickly and relatively easily, without the need for clients to update installed software.

BRIEF DESCRIPTION OF THE DRAWINGS

An illustrative embodiment of the present invention will now be described with reference to the accompanying drawings, wherein.

DETAILED DESCRIPTION OF THE DRAWINGS

Figure 1:
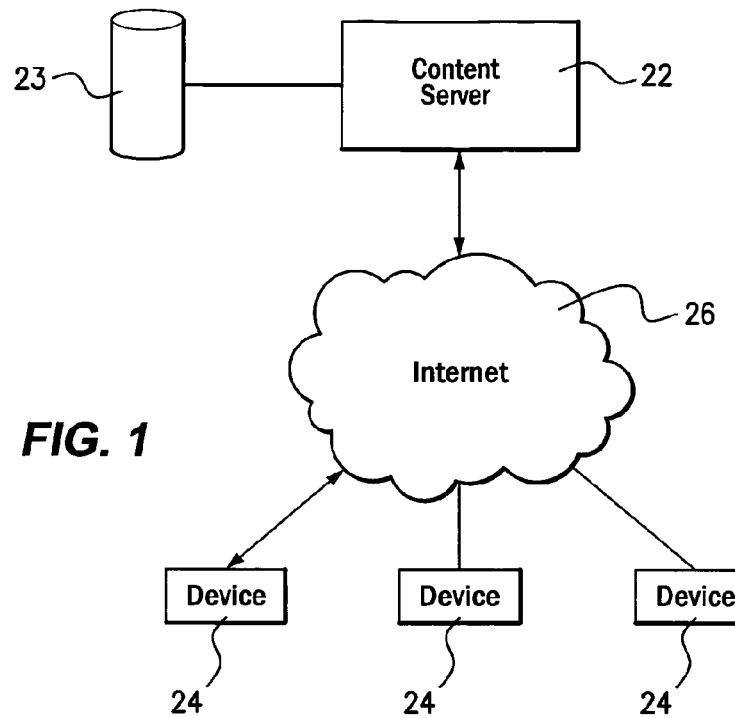
FIG. 1 is a schematic illustration of a suitable network environment in which the present invention is operable.

Turning to FIG. 1, as diagrammatically illustrated, a process in accordance with the present invention operates over the Internet 26 and supplies users with media content, such as films, television programs, or live event broadcasts, by streaming the content from a content server 22 to the device 24 through which the Internet connection is made. The content server 22 may form part of a larger server installation, that includes authentication and payment gateways that in combination provide content-protected media streaming to viewers.

The present invention may be implemented on any device that enables Internet-connectivity, including PCs, laptops, mobile phones, personal data assistants and digital set top boxes.

Figure 2:
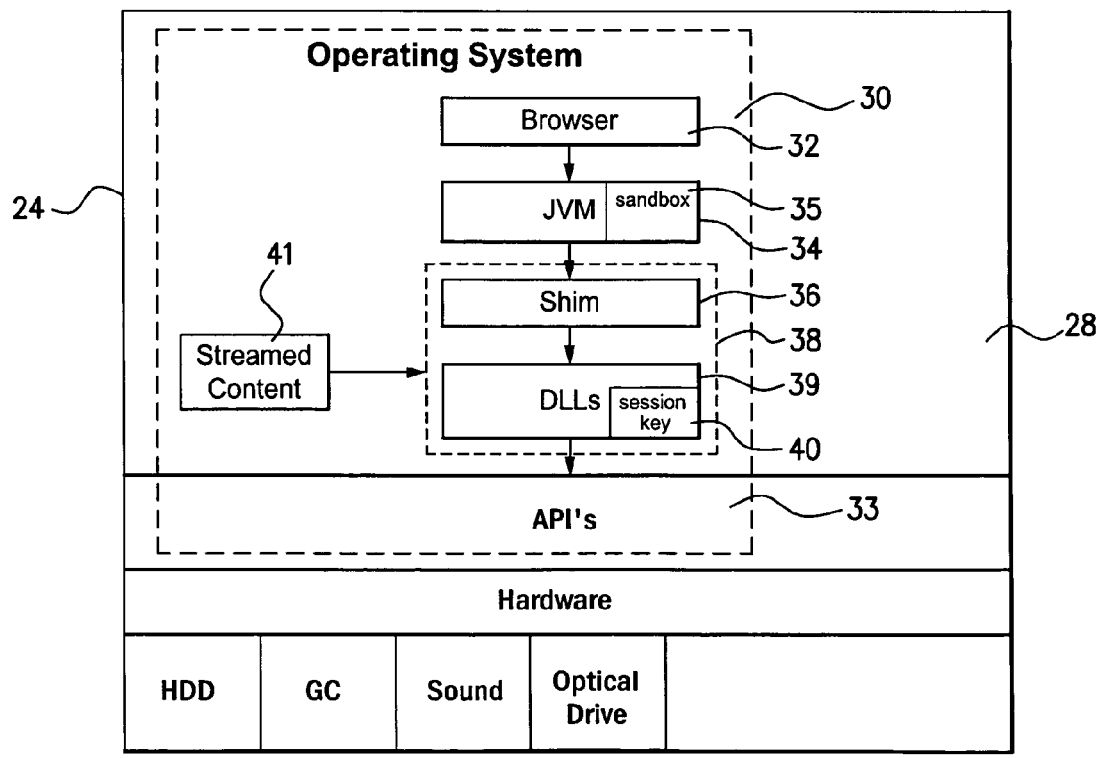
FIG. 2 is a flow chart illustrating the steps of the method for content streaming in accordance with the present invention.

A schematic illustration of a suitable device 24 is provided in FIG. 2. The device 24 is a general purpose computing device which includes a main memory 28 on which a suitable operating system 30 is installed. As known to those skilled in the art, the operating system provides Application Programming Interfaces (APIs) for application programs to access the devices hardware components, such as hard drive, graphics card, sound card, optical drive and the like.

An Internet browser 32, is also installed, along with a virtual machine 34 (such as the Java JVM) for executing byte-code compiled programs, such as Java applets. The virtual machine 34 includes a secure sandbox area 35 for safely running untrusted programs.

Figure 3:
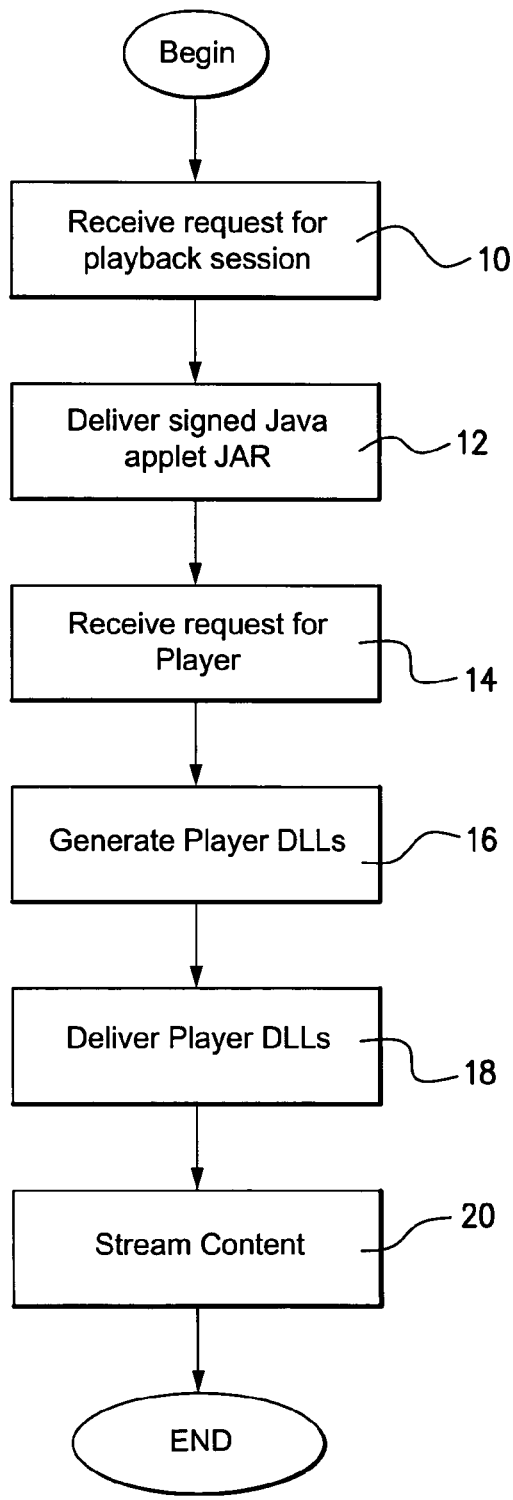
FIG. 3 is a functional block diagram of an Internet-connected user device which is communicatively coupled to a media server, and performs some of the steps of the method illustrated in FIG. 2.

Referring now to FIG. 3, the steps of the method for content delivery to the device 24 shown in FIG. 2 are illustrated. At step 10, the content server 22 (FIG. 1) receives a request to commence a playback session from a device 24 over the Internet 26. In response, at step 12, the content server 22 delivers a Java Archive (JAR) file 36 (referred to as a 'player shim') that has been digitally signed by the vendor of the content delivery software running on the content server 22, to the requesting device 24. Of course other ActiveX objects could be used instead of files in the JAR format.

As known to those skilled in the art, digitally signed software has progressed through a trust chain operated by a trust provider, to give an assurance to users that the software emanates from a known source. The user is then free to decide whether to run the software on their own system depending on their knowledge of that source.

The player shim 36 is a small (60 KB) file, which once downloaded requests permission from the operating system 30 to execute code outside of the virtual machine security sandbox 35.

In the event that permission is granted, the player shim 36 (which contains a Java applet) at step 14 requests delivery of a unique and ephemeral player 38 to play the content which the user has requested from the content server.

At step 16, the requested player is generated on the content server. The player is generated by linking object files—which are pre-compiled to be executable in the particular operating system 28 environment of the requesting device—into one or more suitable dynamic link libraries (DLLs) 39. Compiled player object code is maintained on the content server 22 for all major operating systems (Windows, Linux, Mac etc). Details of the device's 24 operating system 30 are provided to the content server 22 in the request for delivery of a player, so that the correct player is served to the device.

A unique session key 40 is incorporated into the DLLs 39 as part of the process of linking object files into DLLs. The session key serves as a unique identifier for the player 38 and thereby establishes a one to one mapping between playback sessions and the player for that session. The location of the session key is known to the requesting player shim 36. However, the linking process is such that the location of the session key is difficult to determine and the key never leaves designated context inside the DLL 39.

The session key 40 is also stored at the content server in a session database 23, in order to identify the playback session in accordance with the authentication process described below.

The player shim 36 is programmed so as to expire within a few minutes of receipt on a device 24. Accordingly, it is necessary to download a new shim if a request for a player is not made within the expiry time. These temporally limited Java applets narrow the window an attacker might have to break individual session keys.

At step 18 the generated DLLs 39, with the embedded session key 40, are delivered to the device. The DLLs 40 are directly loaded into the main memory 28 of the device 24 under the control of the player shim 36. The DLLs however, are not installed on the operating system 30 or written to the device's non-volatile storage, and are thus 'ephemeral' in the sense used in this specification.

Once installed the DLLs 39 occupy approximately 1 MB of space in main memory 28.

The DLLs 38, once installed, hook into the operating system 30 graphics subsystems, via suitable API's to actually display the requested content 41, which is streamed to the device 24 in step 20.

After the player shim 36 downloads the DLLs, the session key 40 is extracted from the location that is known to, or obtainable by, the player shim 36. As described in further detail below with reference to FIGS. 4 to 6, the session key 40 is used by the player 38 in playing the streamed content 41, which occurs by way of a segmented delivery and playback of individual segments of media data.

Figure 4:
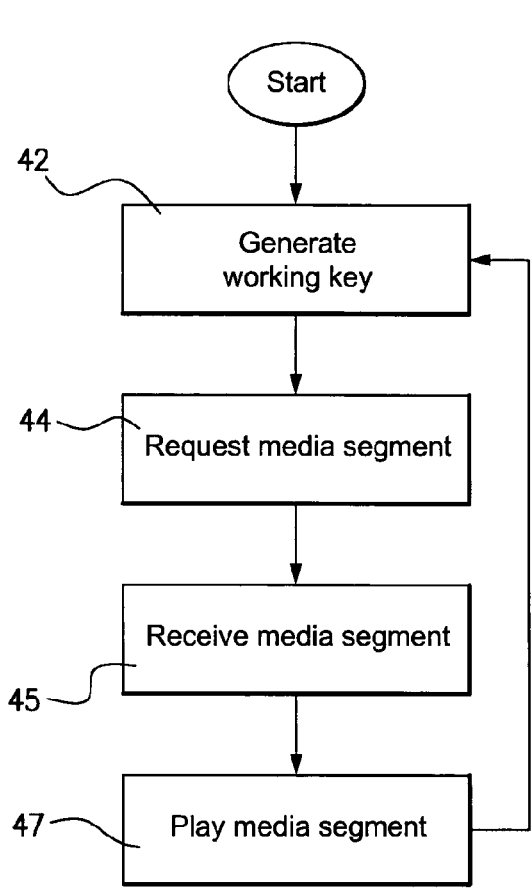
FIGS. 4 and 5 are flow charts outlining the operating procedures of the user device illustrated in FIG. 2, in receiving and playing respectively streamed media in accordance with the present invention.

Turning to FIG. 4, at step 42 the player 38 generates a unique encryption key (known as the working key) for use in encrypting the content that will be streamed to the player.

At step 44, the player 38 issues a request over the Internet 26 to the content server 22 for a segment of media data. The working key generated in step 42 is included in the request for the media data segment, and is therefore also forwarded to the content server 22.

The request itself is encrypted using the session key 40 before being forwarded to the media server 22.

At step 45, the device 24 receives the requested media segment from the content server 22, which in step 47 is played on the player 38. The most recently received media data segment may be loaded immediately into the player 38 for playback, or queued on the device 24 for playback after older segments have been played.

After a predetermined polling interval—the size of which is dependent on the length of the media data segments—the method returns to step 42, with the player 38 generating a new working key, to be used in a new request for a segment of media data. This new request, which contains the new working key, is encrypted using the existing session key 40.

The process continues until the requested media content has been played in its entirety on the media player 38.

Figure 5:
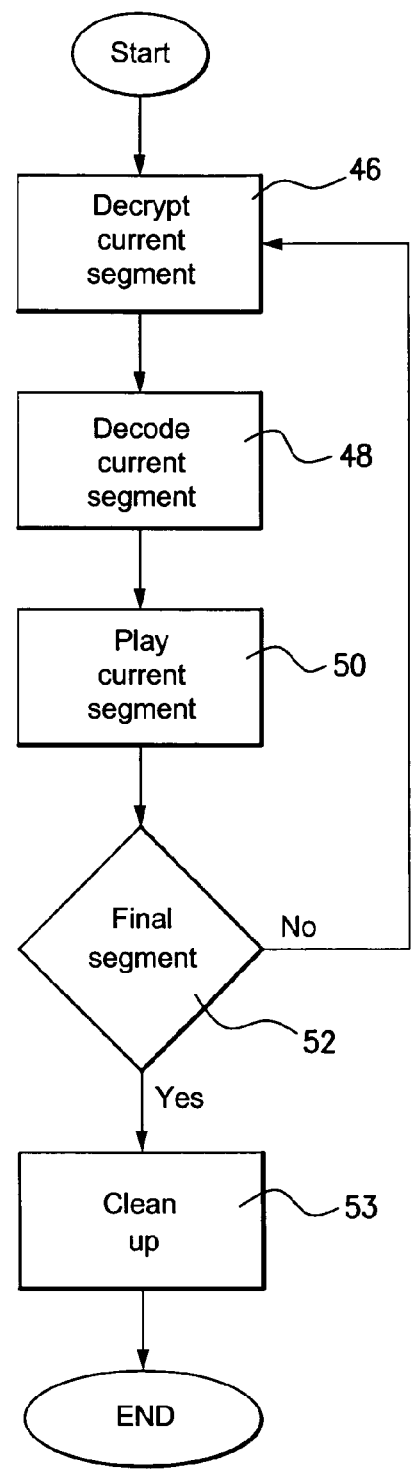

The process of playing a media data segment described in step 47 above, is described in detail with reference to FIG. 5. At step 46 the received segment of media data is decrypted using working key which was generated in step 42 above and specified in the request to the media server for that media data segment.

At step 48 the decrypted data is decoded via a routine supplied with the DLLs 39. The particular decoding routine that is used will of course depend on the format in which the media content was originally encoded. Any suitable codec may be used with the present invention, such as On2's VP6 code.

At step 50 the media data segment is played by the media player 38 by supplying the stream of decoded video data to appropriate operating system API's, which in turn pass the data to drivers for video display hardware whereupon it is displayed for the user.

As described in WO 03/005190, providing a decryption routine with a media player allows video content to be played on a device without requiring the decryption routine or any other media player components to be previously entered on the operating system 30. The media player 38 delivered to the device in response to each individual playback session can thus be made ephemeral.

Referring again to FIG. 5, a test is performed at step 52 to determine whether the current segment is the final segment to be played as part of the requested playback session. The process terminates in the event that the current segment is the final segment, and otherwise returns to the decryption step 46 to process a later received media segment.

After playing the final segment, at step 53, the player 38, including the shim 36, DLLs 39, and session key 40 are wiped from the devices main memory 28.

Figure 6:
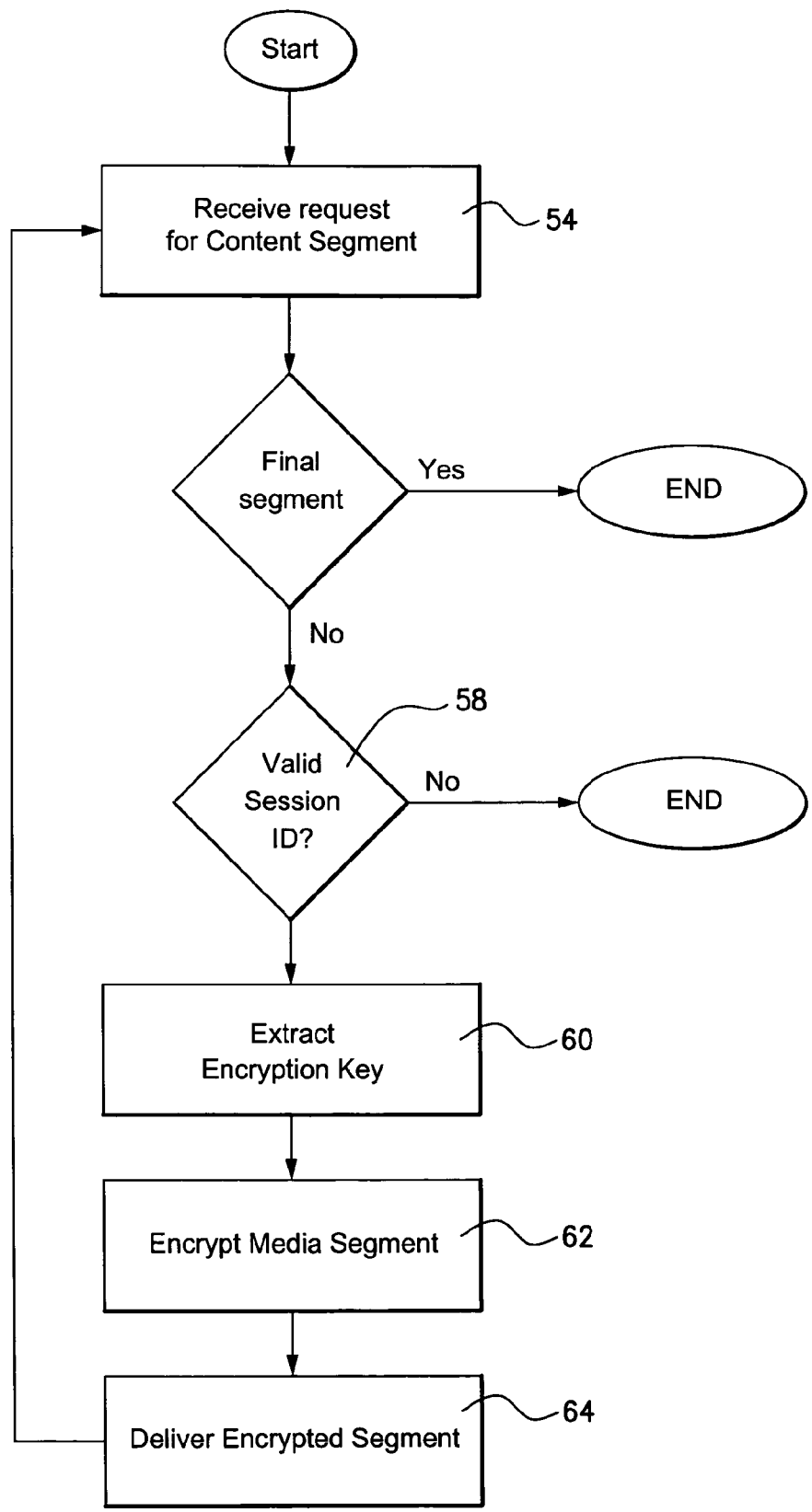
FIG. 6 is a flow chart outlining the operating procedure of a media server operating in accordance with the present invention.

The steps carried out on the media server 22 in fulfilling, requests for media content are described by reference to FIG. 6. At step 54 the content server 22 receives a request for a media data segment as per step 44 above. A test is performed at step 56 to determine whether a further media data segment is available or whether the requested content has been completed.

Where further segments are available for delivery, a test is performed at step 58 to determine whether there is a valid and current session key 40 associated with the requesting playback session. The test involves retrieving a session key from the session database and attempting to decrypt the received request.

As noted above, each request for a media segment is encrypted using the session key for the relevant playback session. Accordingly, any failure of the server to successfully decrypt the request for content equates to an unauthorised reuse of an expired session key, whereupon no content is delivered in response to that request.

Conversely, a successful decryption of a content request equates to the presence of a valid and current session key.

At step 60, the working key included in the request as per step 44 above is extracted from the request and used at step 62 to encrypt the requested media data segment.

The encrypted media data segment is then delivered at step 64 to the user device 28 over the Internet via the HTTPS protocol.

The method then returns to step 54 and awaits further requests from the user device for media content.

Figure 7:
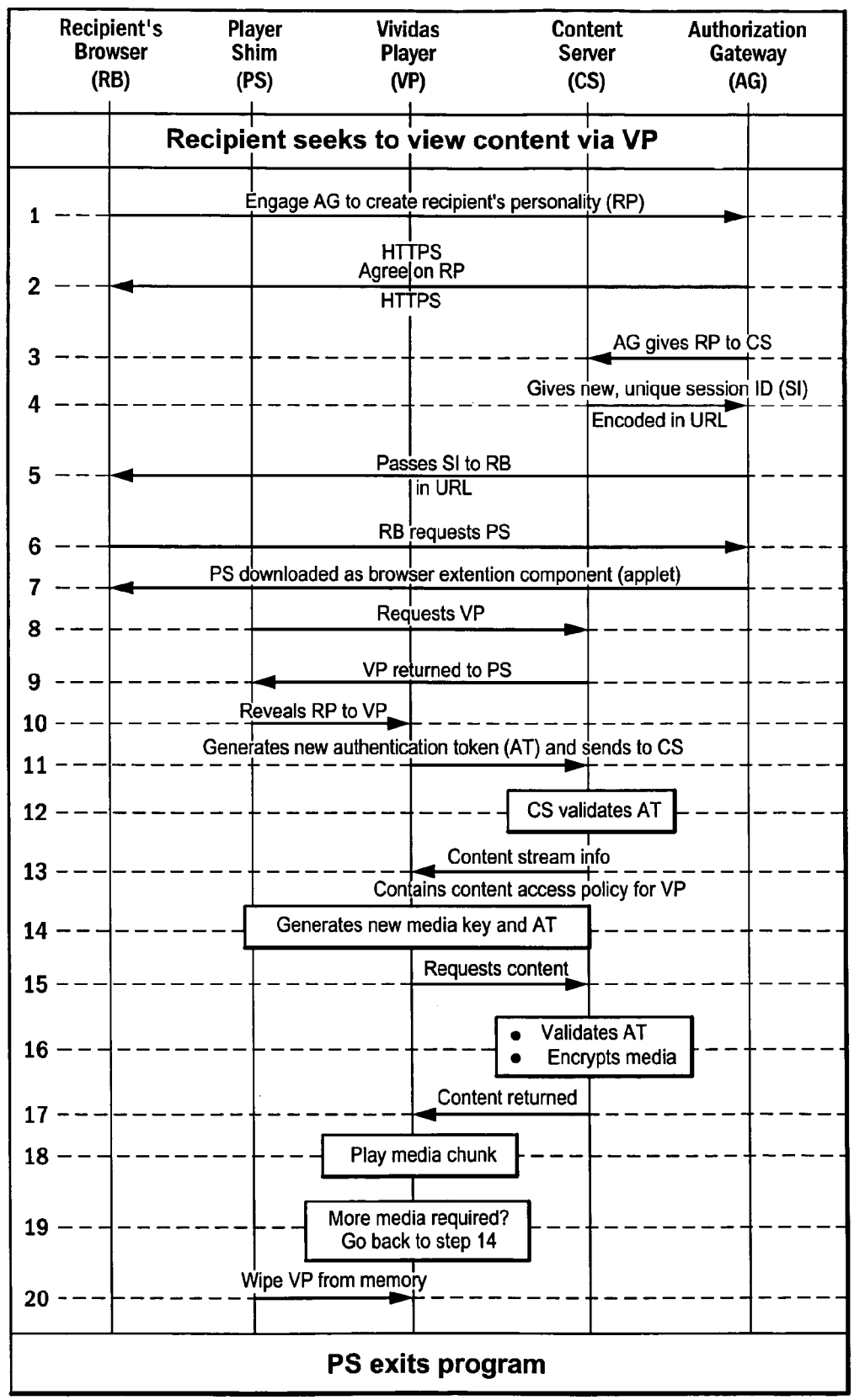
FIG. 7 is an overview sequence diagram showing the operation of the method of the invention and the interaction between the various architecture components of the overall system.

The sequence diagram of FIG. 7 provides and overview of the operation described above, illustrating the message and data flow between the user's browser, the player shim, the ephemeral player (referred to as 'the Vividas player'), the content server, and the authorisation gateway.

As discussed above, the invention serves to overcome a number of disadvantages of the prior art. In particular the feature of an enforced separation between the public half of the player (the player shim 36) and the private half (the dynamically generated DLLs 39 and session key 40), which is uniquely generated and validated for each playback session, provides a high level of assurance to rights holders that playback sessions are unique and have not been replayed.

Moreover because the player is unique and receives media in randomised and encrypted segments, after which the player 39 is lost from the main memory 28 of the device, the chances of an attacker stripping or modifying content entitlements to gain unauthorised access to the content are reduced.

Furthermore, because the dynamically generated working keys are also never saved to the device's secondary storage, the keys cannot be easily extracted and copied and used to obtain unauthorised access to the content.

Finally, because a standalone media player is delivered in response to each unique play-back session, any vulnerabilities in the player itself may be conveniently addressed. This is not the case for installed media players where updates must be made through software patches delivered to each instance of the player.

Modifications and improvements to the invention will be readily apparent to those skilled in the art. Such modifications and improvements are intended to be within the scope of this invention The word 'comprising' and forms of the word 'comprising' as used in this description and in the claims do not limit the invention claimed to exclude any variants or additions. Modifications and improvements to the invention will be readily apparent to those skilled in the art. Such modifications and improvements are intended to be within the scope of this invention.

The invention claimed is:

1. A method for transferring content to a device, the method including the steps of:
   receiving a request for content from the device;
   delivering a loader to the device;
   receiving a request for a player from the loader;
   generating a uniquely identifiable, ephemeral player by:
      incorporating a unique identifier into an object code file at a location that is known to the loader; and linking the object code file into one or more dynamic link libraries that are adapted to execute in the device's native operating system to produce the player without being installed on the operating system or written to the device's non-volatile storage;
delivering the generated player to the device; and
transferring content to the device, for presentation on the device by the player.

2. A method according to claim 1, wherein the unique identifier comprises a session key.

3. A method according to claim 2 including the steps of:
storing the session key; and
validating content requests from the device against the stored session key.

4. A method according to claim 3 wherein the step of validating content requests against the stored session key comprises attempting to decrypt the content request using the stored key.

5. A method according to claim 1, wherein the one or more dynamic link libraries that are operable for interaction with one or more graphics systems associated with the device's operating system.

6. A method according to claim 1, wherein the loader is configured to:
request permission to execute code in the device's operating system;
request delivery of the player in the event that permission is granted; and
directly load the generated player into memory of the device for execution.

7. A method according to claim 6, wherein the loader has a predetermined expiry time and wherein playback session requests made outside of the expiry time are not fulfilled.

8. A method according to claim 6, wherein the loader is a byte code compiled program.

9. A method according to claim 1, wherein the step of transferring content to the device comprises:
dividing the content into segments; and
continually delivering segments of content in response to individual requests for content from the device.

10. A method according to claim 9, including the step of encrypting each content segment with an encryption key specified in the request for content.

11. A method according to claim 10, wherein each said encryption key is unique.

12. A secure content delivery system comprising:
a content server; and
one or more devices communicatively coupled to the content server via a communications network,
wherein the content server is configured to:
receive a playback session request from a device;
deliver a loader to the device;
receive a request for a player from the loader;
generate a uniquely identifiable and ephemeral player by:
incorporating a unique identifier into an object code file at a location that is known to the loader; and
linking the object code file into one or more dynamic link libraries that are adapted to execute in the device's native operating system to produce the player without being installed on the operating system or written to the device's non-volatile storage; and
delivering the generated player to the device.

13. A system according to claim 12 wherein the unique identifier comprises a session key.

14. A system according to claim 12, wherein the loader is configured to:
request permission for execution of code in the device's native operating system;
request delivery of the player in the event that permission is granted; and
directly load the player into main memory of the device for execution.

15. A method according to claim 1, wherein the step of generating is in response to the request for a player from the loader.

16. A system according to claim 12, wherein the content server generates the uniquely identifiable and ephemeral player in response to the request for a player from the loader.

* * * * *